US012318772B2

(12) United States Patent
Lind et al.

(10) Patent No.: US 12,318,772 B2
(45) Date of Patent: Jun. 3, 2025

(54) ANALYSIS INSTRUMENT AND SAMPLE PREPARATION CARTRIDGE

(71) Applicant: Q-LINEA AB, Uppsala (SE)

(72) Inventors: Anders Lind, Tärnsjö (SE); Carl Rosenfeld, Uppsala (SE); Henrik Söderström, Knivsta (SE); Jan Grawé, Uppsala (SE); Henrik Svanberg, Uppsala (SE); Johan Skaborn, Uppsala (SE)

(73) Assignee: Q-LINEA AB, Uppsala (SE)

( * ) Notice: Subject to any disclaimer, the term of this patent is extended or adjusted under 35 U.S.C. 154(b) by 972 days.

(21) Appl. No.: 17/047,793

(22) PCT Filed: Apr. 23, 2019

(86) PCT No.: PCT/EP2019/060383
§ 371 (c)(1),
(2) Date: Oct. 15, 2020

(87) PCT Pub. No.: WO2019/202165
PCT Pub. Date: Oct. 24, 2019

(65) Prior Publication Data
US 2021/0106987 A1 Apr. 15, 2021

(30) Foreign Application Priority Data
Apr. 20, 2018 (GB) .................... 1806505

(51) Int. Cl.
B01L 3/00 (2006.01)
B01L 7/00 (2006.01)
G01N 35/00 (2006.01)
(52) U.S. Cl.
CPC .............. *B01L 3/502* (2013.01); *B01L 3/523* (2013.01); *B01L 7/52* (2013.01); *G01N 35/00* (2013.01);
(Continued)

(58) Field of Classification Search
CPC .. B01L 3/502; B01L 3/523; B01L 7/52; B01L 2200/04; B01L 2200/147;
(Continued)

(56) References Cited

U.S. PATENT DOCUMENTS 675,335 A 5/1901 Luke
6,374,684 B1 4/2002 Dority
(Continued)

FOREIGN PATENT DOCUMENTS

EP 759 898 7/2014
EP 3 098 606 11/2016
(Continued)

OTHER PUBLICATIONS

International Search Report and Written Opinion of the International Searching Authority, issued Jul. 22, 2019 in corresponding International Patent Application No. PCT/EP2019/060383.
(Continued)

*Primary Examiner* — Jill A Warden
*Assistant Examiner* — Jacqueline Brazin
(74) *Attorney, Agent, or Firm* — Wenderoth, Lind & Ponack, L.L.P.

(57) ABSTRACT

An analysis instrument includes a cartridge bay for receiving a sample preparation cartridge. The cartridge bay includes a controllable heater for heating a sample; a first temperature sensor for monitoring the temperature of the controllable heater; and a second temperature sensor for monitoring the temperature of the sample.

17 Claims, 12 Drawing Sheets

(52) U.S. Cl.
CPC ..... *B01L 2200/04* (2013.01); *B01L 2200/147* (2013.01); *B01L 2300/0681* (2013.01); *B01L 2300/1805* (2013.01); *B01L 2400/0478* (2013.01); *B01L 2400/0622* (2013.01); *G01N 2035/00425* (2013.01)

(58) Field of Classification Search
CPC ..... B01L 2300/0681; B01L 2300/1805; B01L 2400/0478; B01L 2400/0622; B01L 2300/1827; G01N 35/00; G01N 2035/00425; G01N 2035/00346
USPC ....................................................... 422/401
See application file for complete search history.

(56) References Cited

U.S. PATENT DOCUMENTS

| | | | |
|---|---|---|---|
| 6,633,785 | B1 | 10/2003 | Kasahara et al. |
| 9,753,026 | B1* | 9/2017 | Todd ................. B01L 3/502738 |
| 2003/0162304 | A1 | 8/2003 | Dority et al. |
| 2009/0291487 | A1* | 11/2009 | Bommer ................. B01L 7/52 |
| | | | 435/303.1 |
| 2010/0028986 | A1 | 2/2010 | Hanafusa |
| 2010/0050749 | A1 | 3/2010 | Yuan |
| 2010/0062446 | A1 | 3/2010 | Hanafusa |
| 2014/0073013 | A1* | 3/2014 | Gorman ................. B01L 7/52 |
| | | | 435/91.2 |
| 2014/0263279 | A1* | 9/2014 | Vandersleen ............. B01L 7/00 |
| | | | 219/494 |
| 2016/0069464 | A1 | 3/2016 | Kroon et al. |
| 2016/0230215 | A1* | 8/2016 | Williams ........... C12N 15/1013 |
| 2016/0367981 | A1* | 12/2016 | Wunderle ........... F16K 99/0034 |
| 2017/0023281 | A1* | 1/2017 | Fromm ..................... B01L 7/52 |
| 2017/0191932 | A1* | 7/2017 | Kokkin ............. G01N 21/6404 |
| 2017/0299483 | A1 | 10/2017 | Ismagilov et al. |
| 2020/0116398 | A1* | 4/2020 | Fromm ................... F25B 21/04 |

FOREIGN PATENT DOCUMENTS

| | | | |
|---|---|---|---|
| GB | 2519577 | 4/2015 | |
| JP | 55-157763 | 11/1980 | |
| WO | 2009/063681 | 5/2009 | |
| WO | 2010/115192 | 10/2010 | |
| WO | 2012/012779 | 1/2012 | |
| WO | WO-2014159615 A2 * | 10/2014 | ............... B01L 7/00 |
| WO | 2017/181020 | 10/2017 | |
| WO | WO-2018168308 A1 * | 9/2018 | ........... B01L 3/5027 |

OTHER PUBLICATIONS

GB Search Report, issued Oct. 19, 2018 in corresponding GB Application No. GB1806505.2.
GB Search Report, issued Mar. 29, 2019 in corresponding GB Application No. GB1806505.2.
Extended European Search Report issued May 2, 2022 in corresponding European Patent Application No. 21214565.0.

* cited by examiner

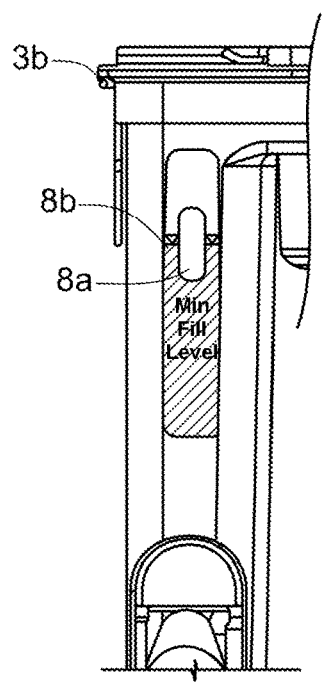
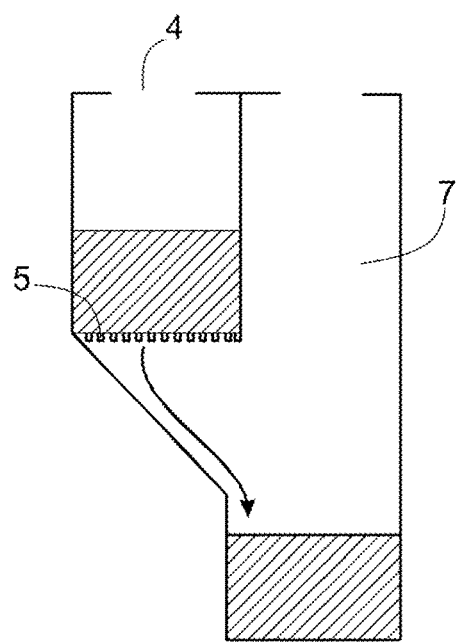
Fig. 2A　　　　　　　　Fig. 2B
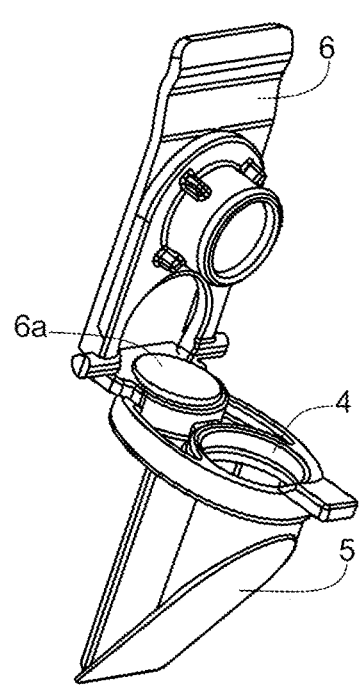
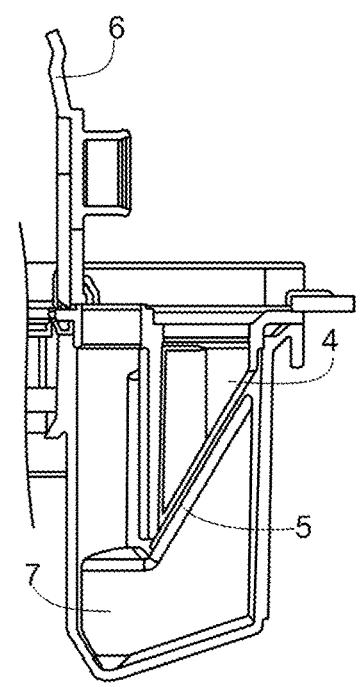
Fig. 2C　　　　　　　　Fig. 2D

ANALYSIS INSTRUMENT AND SAMPLE PREPARATION CARTRIDGE

BACKGROUND OF THE INVENTION

1. Field of the Invention

The present invention relates to an analysis instrument and sample preparation cartridge for use in analysis of samples. In some examples the analysis of samples involves the detection of the presence, amount, and/or absence of microscopic objects in the sample, such as microscopic biological objects. In some examples, the sample may be a blood sample, for example one taken from a positive blood culture flask. In some examples, the analysis instrument may be for performing antimicrobial susceptibility testing (AST).

2. Description of the Related Art

It is important in various fields (for example, in microbiological fields) to be able to prepare samples for analysis efficiently and consistently. Moreover, there is a drive to reduce the burden on users carrying out analyses, such that the preparation of samples for analysis is generally automated and requires little or no user input.

It is known to provide an analysis instrument which receives consumable cartridges used for the preparation and analysis of samples. Such cartridges are disclosed in US 2016/0069464 A1 and U.S. Pat. No. 6,374,684 B1, for example.

However, there remains a need to further improve on analysis instruments and sample preparation cartridges for use in analysis of samples.

SUMMARY OF THE INVENTION

According to a first aspect of the present invention, there is provided an analysis instrument comprising a cartridge bay for receiving a sample preparation cartridge, wherein the cartridge bay comprises: a first controllable heater for heating a sample; a first temperature sensor for monitoring the temperature of the first controllable heater; and a second temperature sensor for monitoring the temperature of the sample.

Advantageously, such a configuration comprising two independent temperature sensors enables the sample to be heated to a desired predetermined temperature as quickly as possible, without risking the integrity of the sample. For example, in the case that the sample is a blood sample from a blood culture flask, to be prepared for AST, it is desirable to avoid that the sample is clotted by overheating, or that the pathogens are killed by the heat.

Measurement of the temperature of the sample is useful since the temperature of the sample may not be at a predetermined temperature when heating of the sample by the first controllable heater commences. For example, the sample may have been pre-heated (in a blood culture cabinet, for example) or may have been left under room temperature conditions for some time. Moreover, the cartridge bay may not be a temperature-controlled area of the analysis instrument, such that the temperature in the cartridge bay may also vary. Provision of the second temperature sensor therefore enables the sample to be heated more accurately, by taking into account the actual ambient conditions and the initial temperature of the sample.

Additionally, contact between the syringe heater and a syringe barrel holding the sample may not be equally good every time a sample preparation cartridge is placed in the cartridge bay (i.e. contact between the syringe heater and the syringe barrel may not be consistent for every sample preparation cartridge). Again, provision of the second temperature sensor allows the sample to be heated more accurately, even under these circumstances.

The analysis instrument may comprise a controller operable to receive data from the first and second temperature sensors. The controller may be configured to control the temperature of the first controllable heater, based on the data received from the first and second temperature sensors.

The controller may for example be a microcontroller, which itself may be controlled by a computer.

In particular, the controller may be configured to heat the sample to a predetermined temperature by: controlling the first controllable heater to be at an initial temperature that is higher than the predetermined temperature, whilst the temperature measured by the a second temperature sensor is below a predetermined threshold; and controlling the first controllable heater to reduce its temperature from the initial temperature to a lower temperature, when the temperature measured by the a second temperature sensor exceeds the predetermined threshold.

The lower temperature is lower than the initial temperature, but may be higher than the predetermined temperature (i.e. the temperature to which it is desired to heat the sample in the syringe). Thus, the lower temperature may be the predetermined temperature plus a predetermined offset. The offset may be provided in order to compensate for any temperature losses in the system.

In one example, the initial temperature is 50° C., the predetermined temperature is 35° C., the offset is 2° C., and the lower temperature is therefore 37° C.

The reduction in temperature from the initial temperature to the lower temperature may be a single-step change from the initial temperature to the lower temperature. Alternatively, the temperature may be gradually reduced from the initial temperature to the lower temperature.

The first temperature sensor and the second temperature sensors may be different sensor types. For example, the first temperature sensor may rely on a direct measurement of temperature at the location of the temperature sensor, whereas the second temperature sensor may be a non-contact sensor for indirect measurement of the sample temperature.

Optionally, the first temperature sensor is a NTC thermistor. Alternatively, the first temperature sensor may be a thermocouple sensor or a Resistance Temperature Detector (RTD). Any other suitable temperature sensor may instead be used.

Optionally, the second temperature sensor is an IR sensor. Use of an IR sensor is advantageous as it allows non-contact measurement of the temperature of the sample. That is, the IR sensor does not contact the sample, and hence there is no possibility of contamination by the sample.

The first controllable heater comprises a cylindrical concave heating surface. The cylindrical concave heating surface preferably has a shape conforming to that of the syringe barrel (which holds a sample to be heated) present in the sample preparation cartridge received by the analysis instrument.

The first controllable heater may be spring mounted. This may facilitate a constant and reliable contact between the cylindrical concave heating surface of the first controllable heater and the syringe barrel present in the sample preparation cartridge received by the analysis instrument. Advantageously, this may lead to more efficient and consistent heating of the syringe barrel by the first controllable heater.

The cartridge bay optionally comprises a second controllable heater shaped to receive a plurality of wells provided in the sample preparation cartridge, for heating the contents of the wells. That is, the second controllable heater may be a heater block comprising blind holes into which a plurality of wells provided in the sample preparation cartridge can be dropped, when the sample preparation cartridge is inserted into the cartridge bay. Providing a second controllable heater shaped in this way allows for efficient and consistent heating of the plurality of wells received by the second controllable heater.

The second controllable heater may comprise a third temperature sensor. The third temperature sensor may use a direct measurement of heat at the sensor location. It may be a NTC thermistor. Alternatively, the third temperature sensor may be a thermocouple sensor or a Resistance Temperature Detector (RTD). Any other suitable temperature sensor may instead be used.

The second controllable heater may be controlled by a controller configured to control the temperature of the second controllable heater, based on the data received from the third temperature sensor. The controller may for example be a microcontroller, which itself may be controlled by a computer. The controller (and computer) may be the same controller (and computer) used to control the first controllable heater.

The second controllable heater may be set to a temperature (as measured by the third temperature sensor) corresponding to a predetermined target temperature. The second controllable heater may be turned on between 3 and 10 minutes before it is necessary to heat the plurality of wells received by the second controllable heater. Then, the data from the third temperature sensor is used to control the second controllable heater to heat at the predetermined target temperature. Once it is no longer necessary to heat the plurality of wells received by the second controllable heater, the second controllable heater may be turned off.

This predetermined target temperature may be the temperature to which it is desired to heat the plurality of wells received by the second controllable heater. Whereas the first controllable heater may initially be set at a higher temperature than the desired predetermined temperature, the second controllable heater may simply be set to the predetermined target temperature.

The fluid received in the plurality of wells for heating by the second controllable heater may already have been heated by the first controllable heater, and so may be at an expected temperature when the second controllable heater begins heating. As a result, the temperature of the sample in the plurality of wells may not be monitored, and control of the second controllable heater may note rely on measurement of the temperature of the sample in the plurality of wells received by the second controllable heater.

The cartridge bay optionally comprises a cooling means (for example, a Peltier element comprising a cooling fan) which may be operated in the event that the temperature rises too high within the cartridge bay, causing the second controllable heater to become too hot (as measured by the third temperature sensor). The second controllable heater may then be cooled by the cooling means. The cooling means may be controlled by a controller, optionally the same controller which controls the first and/or second controllable heaters.

Where a cooling fan is provided, the fan may be mounted at an angle to the second controllable heater so that the airflow cools the second controllable heater. The cooling fan may also serve to move air in and out of the cartridge bay (through holes in the sides of the cartridge bay shell, as described below).

The cartridge bay may comprise a key for engagement with a corresponding slot on the sample preparation cartridge. The key may comprise a projecting portion, for example shaped as a linear tab. The cartridge bay may comprise a motor configured to rotate the key. In particular, the key may be rotated in the vertical plane about its center.

The cartridge bay may comprise a hook configured to receive a syringe piston flange.

The syringe piston hook may comprise two projections, respectively forming a first abutment surface of the hook and a second abutment surface of the hook. The two abutment surfaces may be parallel vertical surfaces and may be spaced apart by approximately the width of the syringe piston flange. The second abutment surface may comprise two tines with a groove therebetween. The groove may be sized so as to receive the syringe piston.

The sample preparation cartridge may be lowered downwardly into the cartridge bay of the analysis instrument. In such a case the cartridge bay may be arranged such that on insertion of the sample preparation cartridge into the cartridge bay, the syringe piston flange drops between the first and second abutment surfaces of the hook. The syringe piston flange may be held between the first abutment surface and the tines of the second abutment surface. The syringe piston may lie in the groove.

The hook may be slidable along a linear rail to move the syringe piston in and out of the syringe barrel. The hook may be moved along the linear rail by a motor.

The cartridge bay may comprise a sensor (for example an optical sensor, and in particular a reflective sensor) for checking that there is a sample preparation cartridge loaded into the cartridge bay before processing of the sample preparation cartridge begins.

The cartridge bay may comprise a shell housing the various components outlined above. The shell may be perforated at the sides close to the second controllable heater (i.e. the sides may have holes in them). This allows heat to be moved out of the shell. Where a cooling fan is provided in the cartridge bay, this may be operable to move air in and out of the cartridge bay through the holes (perforations) in the sides of the cartridge bay shell.

According to a second aspect of the invention, there is provided a sample preparation cartridge comprising: a multi-way valve; and a syringe, the syringe comprising: a barrel for receiving a fluid; a piston slidably located within the barrel; and an orifice for fluid flow into and out of the barrel under the action of the piston, wherein the syringe barrel is fluidly connected to the multi-way valve via the orifice.

The syringe may have just one orifice for inlet and outlet of fluid from the syringe barrel. Fluid flow out of the syringe barrel may pass through the orifice and downstream to the multi-way valve. Similarly, fluid flow into the syringe barrel may pass first through the multi-way valve, then through the orifice and into the syringe barrel. The syringe itself may not affect the direction of fluid flow, beyond drawing it in through the orifice, or pushing it out through the orifice, by movement of the piston.

The syringe barrel may be stationary. That is, the syringe barrel is fixed with respect to the sample preparation cartridge. In particular, the syringe barrel does not rotate. For example, the syringe does not rotate about a central longitudinal axis lying along the center of the barrel.

This contrasts with the syringes used in the prior art mentioned above, in which the syringe barrel effectively has a valving function wherein rotation of the syringe barrel brings the output of the syringe into alignment with various ports.

The configuration adopted herein is advantageous in that the sample preparation cartridge itself becomes less complex, and requires less space, because it is easier to have more efficient packaging of the components within the sample preparation cartridge.

The sample preparation cartridge may comprise a housing. The housing may define the sides and base of the sample preparation cartridge.

The syringe barrel may be fixed with respect to the housing of the sample preparation cartridge.

The housing may comprise an aperture allowing access to the syringe barrel. The aperture may for example facilitate contact between the syringe barrel and a first controllable heater provided in an analysis instrument which receives the sample preparation cartridge.

The syringe piston may comprise a flange for pushing the piston into the barrel, or withdrawing the piston from the barrel. As is usual, the flange may be located at the end of the piston opposite from the end of the piston received in the syringe barrel. The flange may be accessible from outside of the sample preparation cartridge through a syringe flange aperture in the housing of the sample preparation cartridge.

In particular, the flange may be received by a hook provided in the cartridge bay of an analysis instrument which receives the sample preparation cartridge.

The hook which receives the flange may be slidable along a linear rail, with movement of the hook along the linear rail causing corresponding movement of the flange, and hence movement of the syringe piston within the barrel.

The multi-way valve may for example be a three-way valve. As mentioned above, the multi-way valve is selectively connected to the syringe. The multi-way valve may also be selectively connected to a first filter (discussed below) and selectively connected to an input well.

The multi-way valve is optionally rotated via a valve actuator which protrudes from the housing through a valve actuator aperture in the housing. The valve actuator may have a broadly cylindrical shape, and may comprise two faces separated by the body of the cylinder. One of the faces may protrude from the housing, and this face may comprise a valve interface slot. The valve interface slot may comprise an open end and a closed end, with a broadly linear slot running between the open end and closed end. A valve interface slot with this configuration is able to receive a key having a shape corresponding to the slot, but only when the valve interface slot (and hence the multi-way valve) is in the correct orientation.

A key may be provided in the cartridge bay of the analysis instrument that receives the sample preparation cartridge, and the key may be oriented vertically. The sample preparation cartridge may be lowered downwardly into the cartridge bay of the analysis instrument. The particular configuration of the valve interface slot means that the valve interface slot can only be received over the valve key when the open end of the valve interface slot is oriented vertically downwardly (i.e. the valve actuator is rotated so that the open end of the valve interface slot is at the lowermost position). When the valve interface slot is not orientated vertically, or when it is orientated vertically but with the closed end positioned at the downward position (i.e. when the valve actuator is rotated so that the closed end of the valve interface slot is at the lowermost position), the valve interface slot cannot be received over the valve key. This means that, for the sample preparation cartridge to be correctly received in the cartridge bay, the valve interface slot must be in a predetermined orientation and hence the multi-way valve must also be in a known, predetermined position.

The second face of the valve actuator may comprise a plurality of slots which receive arms of the multi-way valve, these arms constituting a valve-turning mechanism. Rotation of the valve interface slot (via the key provided in the cartridge bay, which may be turned by a motor) may turn the valve actuator and hence cause rotation of the multi-way valve.

The valve actuator and syringe piston flange may protrude from opposite sides of the sample preparation cartridge. Accordingly, the key and hook which respectively engage with these portions may be provided at opposite sides of the cartridge bay.

The sample preparation cartridge may comprise a first filter in selective fluidic connection with the multi-way valve, for filtering a fluid received from the syringe barrel.

The filter preferably will have a pore size suitable for the recovery of microbial cells from a solution. Optionally, the filter will have a pore size of less than or equal to 0.6 µm, or less than or equal to 0.5 µm, 0.4 µm, 0.3 µm or 0.2 µm. In one example, the pore size of the filter is 0.2 µm. The filter may for example be a nylon filter.

The sample preparation cartridge may comprise an input port for receiving a sample. The sample inlet port may be closed by a user-closable lid. The user-closable lid may have the functionality of protecting the well beneath the sample inlet port prior to filling and also protects against accidental spills after filling.

The user-closable lid may be configured to close with a snap. This provides the user with tactile feedback to confirm that the lid is properly closed. Additionally, the air pressure pulse produced by closing the user closable lid may improve passing of the sample through a sample introduction filter (see below).

A sample introduction filter is optionally provided for filtering the sample input through the input port. Optionally, the sample introduction filter is held in place by the hinges of the user-closable lid.

The sample preparation cartridge may comprise a top deck having a plurality of wells for containing and/or mixing reagents and/or the sample. The top deck may snap over the top of the housing, and may thereby be fixed in place.

The sample input port for receiving a sample and user-closable lid may be part of the top deck. The top deck may also comprise a sample receptacle for receiving the sample via the sample inlet. The sample introduction filter may be held in-line within the sample receptacle.

The top deck may also define a plurality of wells, for receiving samples for concentration determination, for example.

The top deck may be (at least partially) covered by a foil or a lid, to be removed by the user, for example, before placing the sample preparation cartridge into the cartridge bay. All of the top deck components except the locations for a snap-in insert or a plurality thereof (see below) and the user-closable lid of the sample inlet port (see above) may be covered by the foil or lid. The lid or foil may have the functionality of protecting the parts covered by the lid or foil from contamination. Where a lid is provided, this may have the additional functionality of preventing the sample preparation cartridge from being loaded into the analysis instrument until the lid is removed, and the sample preparation cartridge is in a state such that it can be processed by the analysis instrument. The lid may be replaceable, once it has been removed (though it must be removed prior to placement of the sample preparation cartridge into the cartridge bay).

The top deck may also define locations for a snap-in insert (or a plurality thereof). Some of the wells (in particular, some of the reagent wells) may be provided as snap-in inserts, some of which may be delivered to the user in situ in the top deck of the sample preparation cartridge, and some of which may be inserted into the top deck by the user.

The reagent wells may be covered by a foil that can be pierced by a pipette tip. This may be an extra foil in addition to the top deck cover foil.

The top deck may also comprise a plurality of pipette tips, for example up to 16 pipette tips. Providing a plurality of different sized tips allows different volumes of fluid to be handled. The precision of the volume handled may differ between different sized tips.

The sample preparation cartridge may be arranged for use with the analysis instrument of the first aspect. Conversely, the analysis instrument may be configured to receive the sample preparation cartridge of the second aspect.

The invention also extends to a system comprising the analysis instrument of the first aspect (including any or all of the preferred features thereof) and the sample preparation cartridge of the second aspect (including any or all of the preferred features thereof).

The sample preparation cartridge may be received into a cartridge bay of the analysis instrument. Lowering the sample preparation cartridge (and optionally pushing the sample preparation cartridge down) into the cartridge bay of the analysis instrument may cause the various interfaces between the sample preparation cartridge and analysis instrument to engage with each other.

The analysis instrument may be for AST. In such an analysis, a sample containing a pathogen may be cultured in the presence of various antimicrobial substances at different concentrations to determine the minimum inhibitory concentration (MIC) of the antimicrobial substance, and/or to categorize the pathogen as "susceptible", "intermediate", or "resistant" (SIR).

The sample preparation cartridge may be configured for preparing a sample for AST from a sample derived from a blood sample taken from a positive blood culture flask.

Whilst the present disclosure is discussed in the context of AST, and of a sample derived from a blood sample taken from a blood culture flask, the invention itself is much more generally applicable, as will be appreciated by the skilled person.

BRIEF DESCRIPTION OF THE DRAWINGS

Certain preferred embodiments of the present invention will now be described by way of example only and with reference to the attached drawings, in which:

FIG. 2 shows further details of the exemplary sample preparation cartridge of FIG. 1;

DETAILED DESCRIPTION OF THE INVENTION

Sample Preparation Cartridge

Figure 1A:
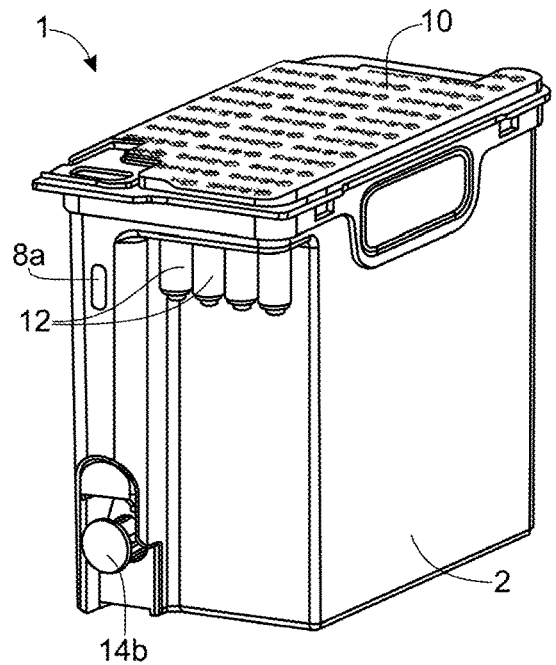
FIGS. 1A to 1C show an exemplary sample preparation cartridge from a first perspective view.
Figure 1B:
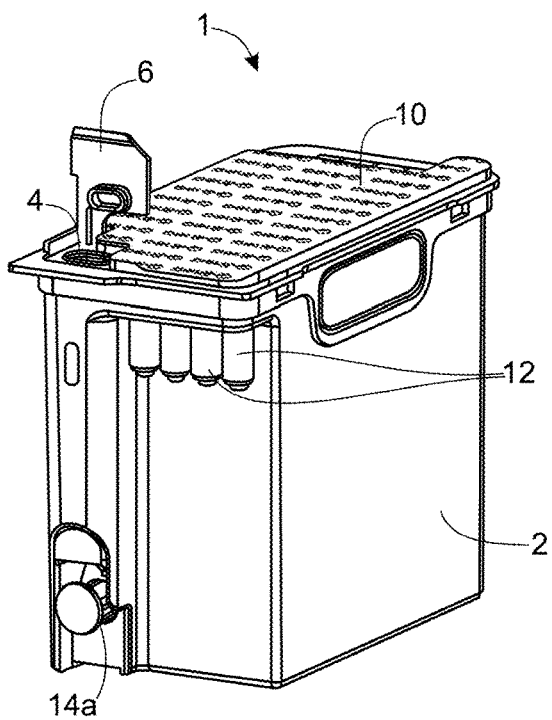
Figure 1C:
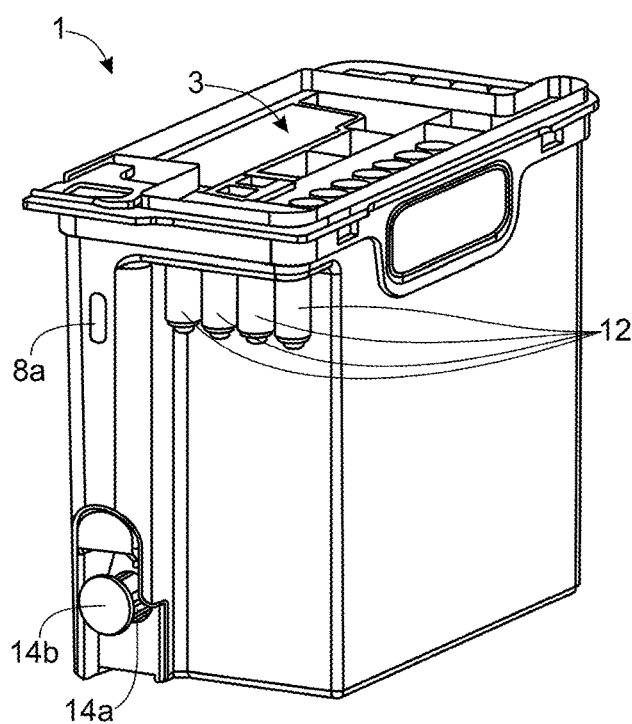

In an exemplary process, the sample preparation cartridge 1 is used in the preparation of a suspension of pathogens at a predefined concentration in a medium compatible with growth for MIC/SIR determination in AST. The input to the sample preparation cartridge 1 is a sample from a blood culture flask (BCF), in particular from a positive BCF.

In more detail, the exemplary process can be broken down into the following steps:
1. Receiving a sample from a positive BCF.
2. Filtering the sample to remove resin particles from the sample.
3. Lysing human-derived cells in the sample by preparing a lysis medium, mixing this with the sample or an aliquot of the sample, and incubating.
4. Separating pathogens from the lysate by filtering and subsequently washing the pathogens captured on the filter membrane.
5. Re-suspending the captured pathogens in a medium compatible with growth.
6. Preparing a subsample for pathogen concentration determination by diluting an aliquot of the resuspended pathogens in a medium containing ethanol (to inactivate possible staining inhibition structures or mechanism), and staining the dilution with a pan-bacterial fluorescent stain (also referred to herein as a dye) under temperature control.
7. Upon completed concentration determination (performed outside of the sample preparation cartridge 1), in cases where the concentration is sufficient for further analysis, preparing one or more dilutions of the re-suspended pathogens at a predetermined concentration, at a volume sufficient to fill sample wells in a sample holder used by the analysis instrument. For example, a first dilution is prepared in non-fastidious medium. In cases where the concentration of pathogens is sufficient, a second dilution of re-suspended pathogens in fastidious medium can be prepared.

An exemplary sample preparation cartridge 1 which is capable of performing the above steps is discussed in detail below. Note that the sample preparation cartridge 1 is not intended to be limited to use in such a process.

The sample preparation cartridge 1 comprises a housing 2 forming the main body of the sample preparation cartridge 1. The housing 2 defines various apertures and fastening points for interfaces between components within the sample preparation cartridge 1, and the analysis system. The housing 2 also provides positions for labels (for example comprising human-readable information, or a bar code, QR code, or another machine-readable code) to identify the sample preparation cartridge 1 and/or the sample (for example, using a patient ID). The housing 2 may in particular form the base and sides of the sample preparation cartridge 1. The sample preparation cartridge 1 comprises the following components housed within the housing 2: a three-way valve 17; a valve actuator 18; a 3 ml syringe 14 comprising a barrel 14c and a piston 14a; and a filter 16. In this example the filter is a nylon filter having a pore size of 0.2 µm. The multi-way valve may for example be a three-way valve. One suitable valve is part number 60MP0436, manufactured by Mediplast A/S. The multi-way valve 17 is connected to the syringe 14, the filter 16 and an input well (filtration inlet well 45). That is, the multi-way valve 17 can be connected to each of these depending on the position that the multi-way valve 17 is rotated to.

Figure 6:
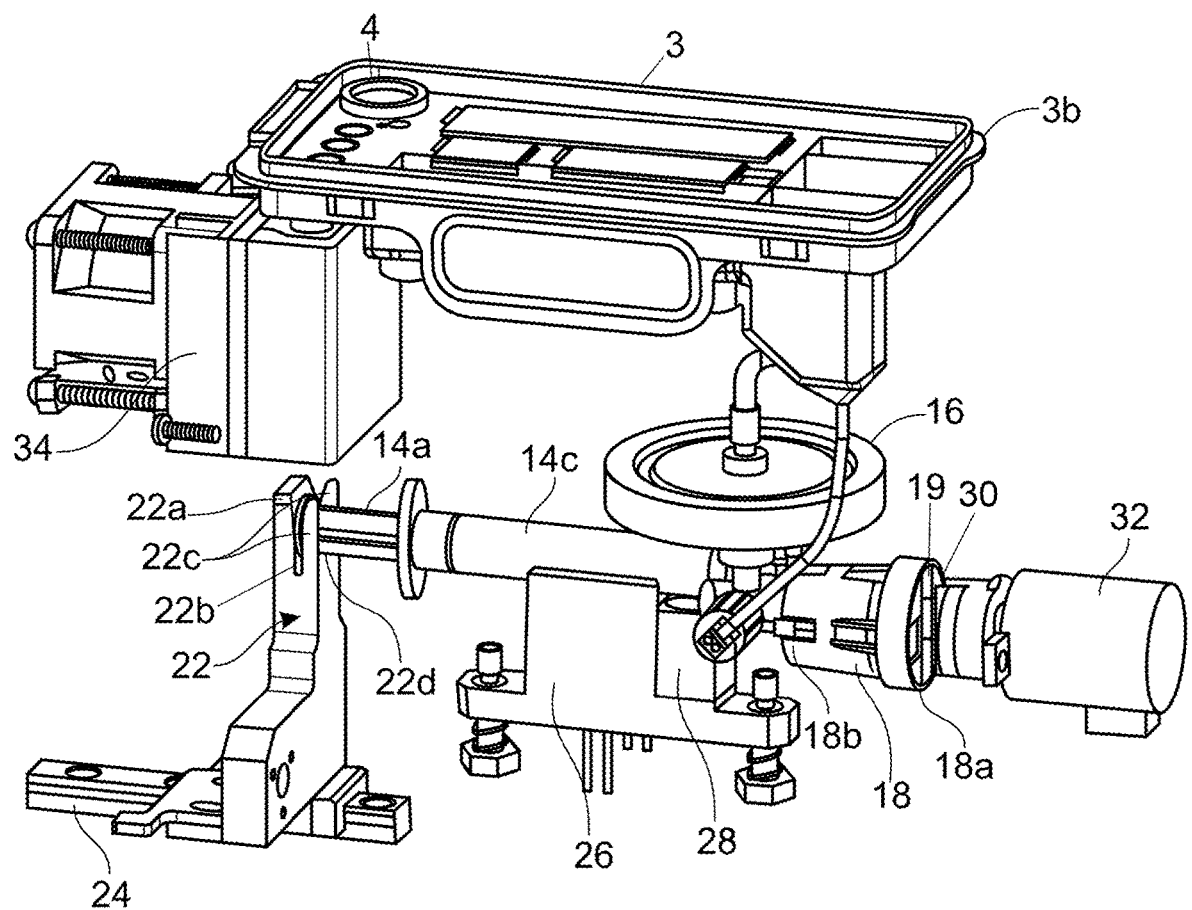
FIG. 6 shows points of interface between the exemplary sample preparation cartridge of FIG. 1 and an exemplary analysis instrument, when the sample preparation cartridge is received within the cartridge bay of the analysis instrument.
Figure 7:
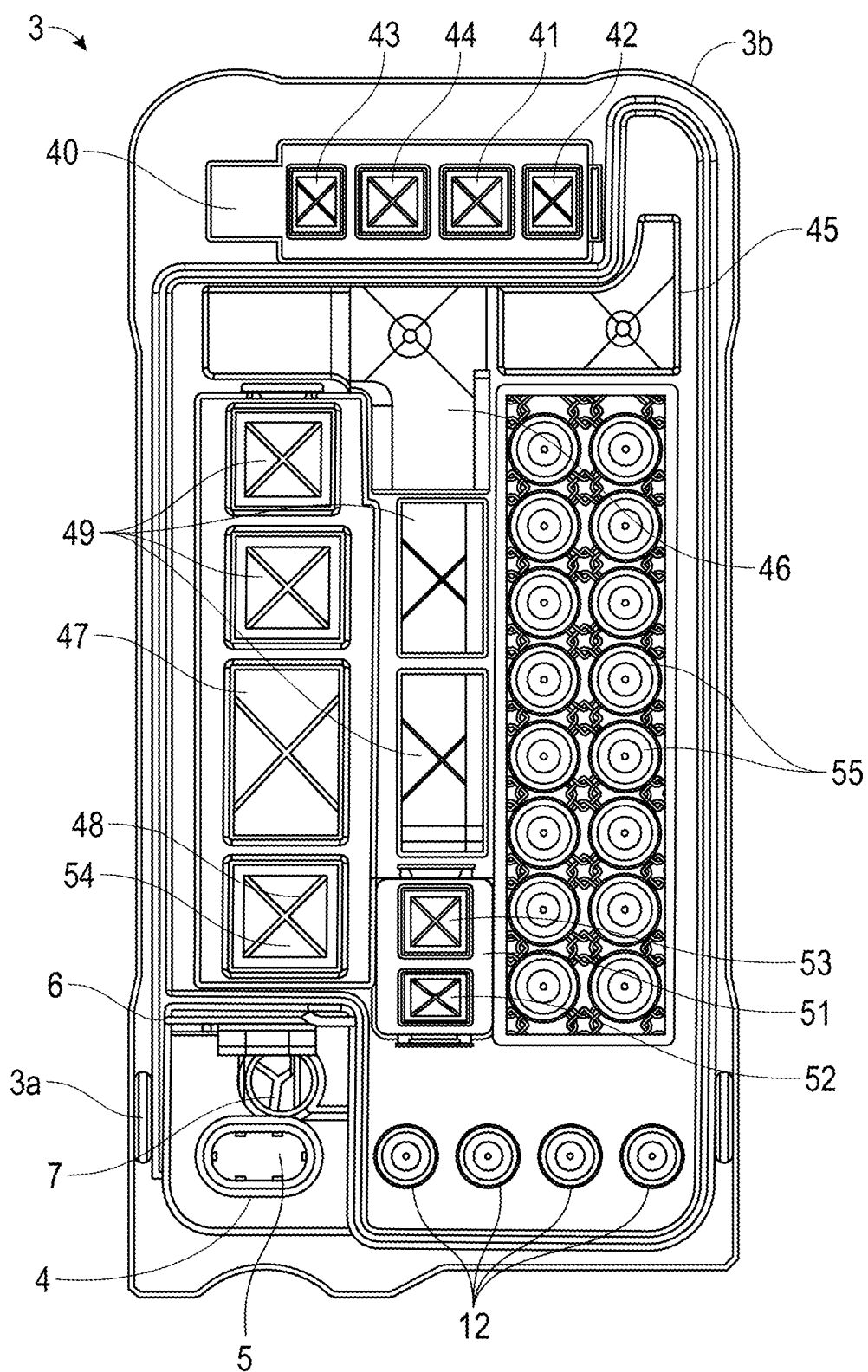
FIG. 7 shows the various reagent wells and mixing wells provided in the exemplary sample preparation cartridge of FIG. 1.
Figure 8A:
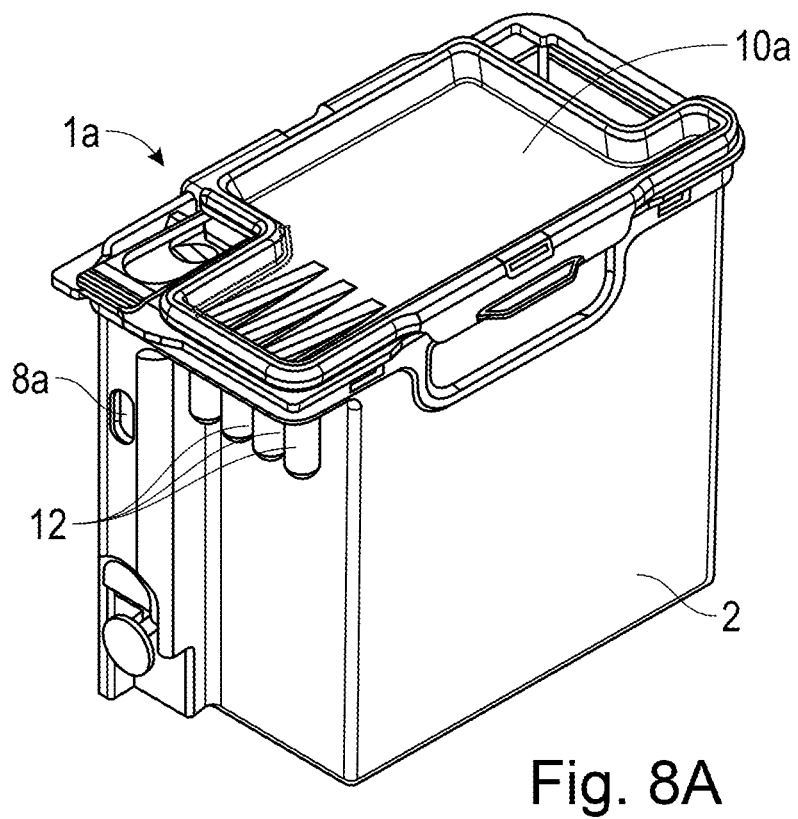
FIGS. 8A to 8G show an exemplary sample preparation cartridge having a lid (FIG. 8A: perspective view, FIG. 8B: top view, FIG. 8C: bottom view, FIG. 8D: left view, FIG. 8E: right view, FIG. 8F: front view, FIG. 8G: rear view, and FIG. 8H: top view with the lid removed and the user-closable lid opened)
Figure 8B:
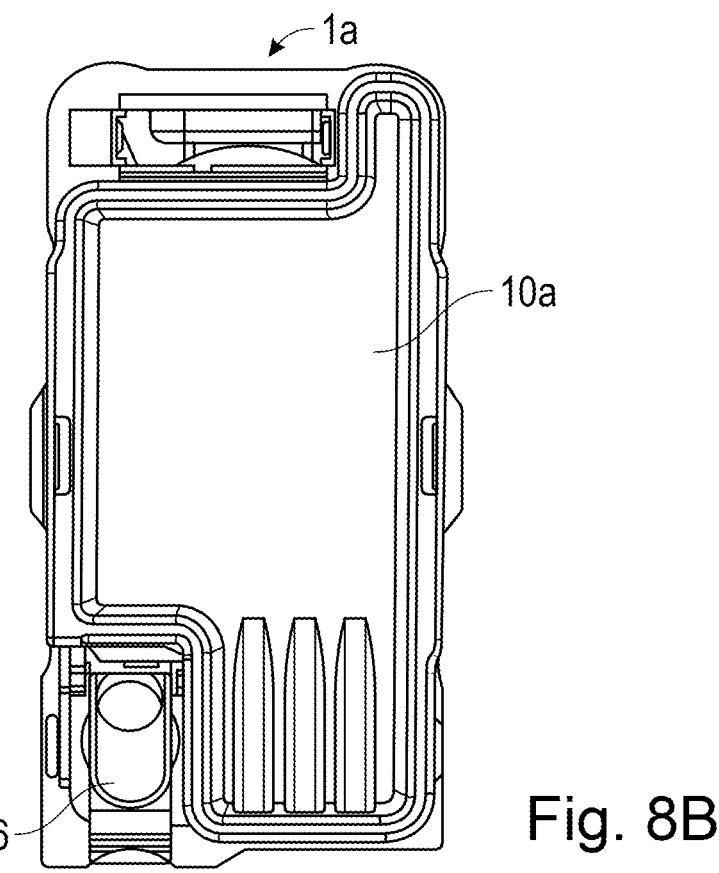
Figure 8C:
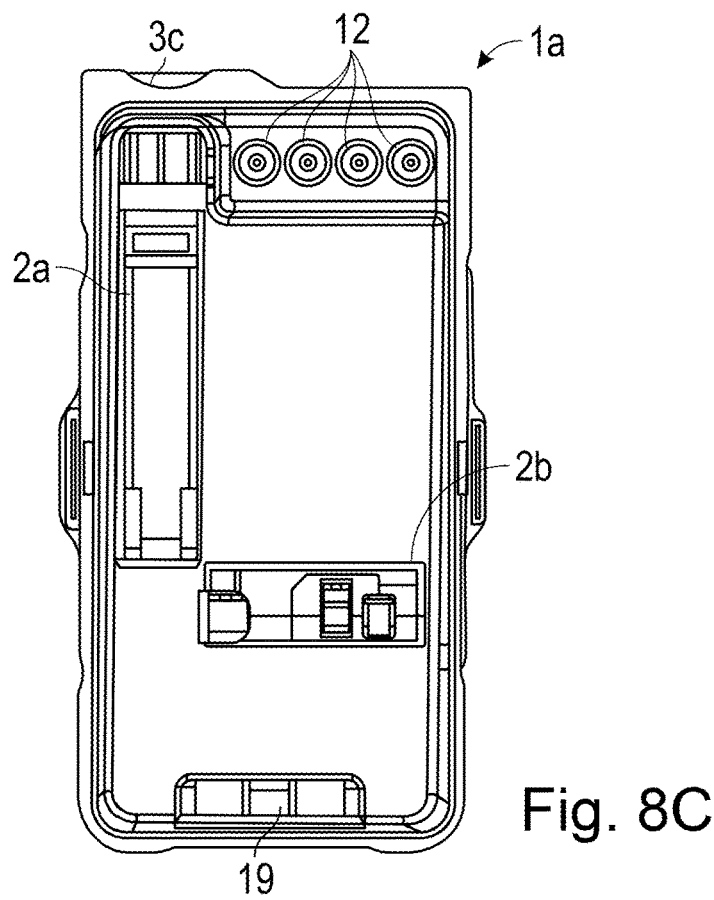
Figure 8D:
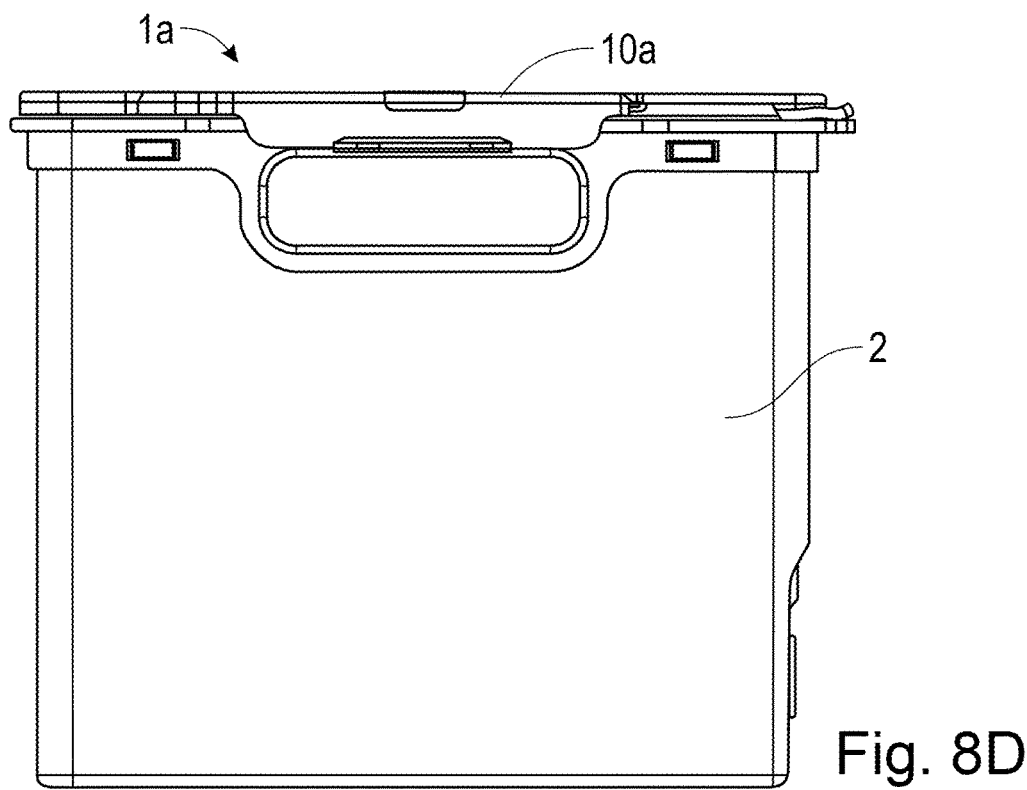
Figure 8E:
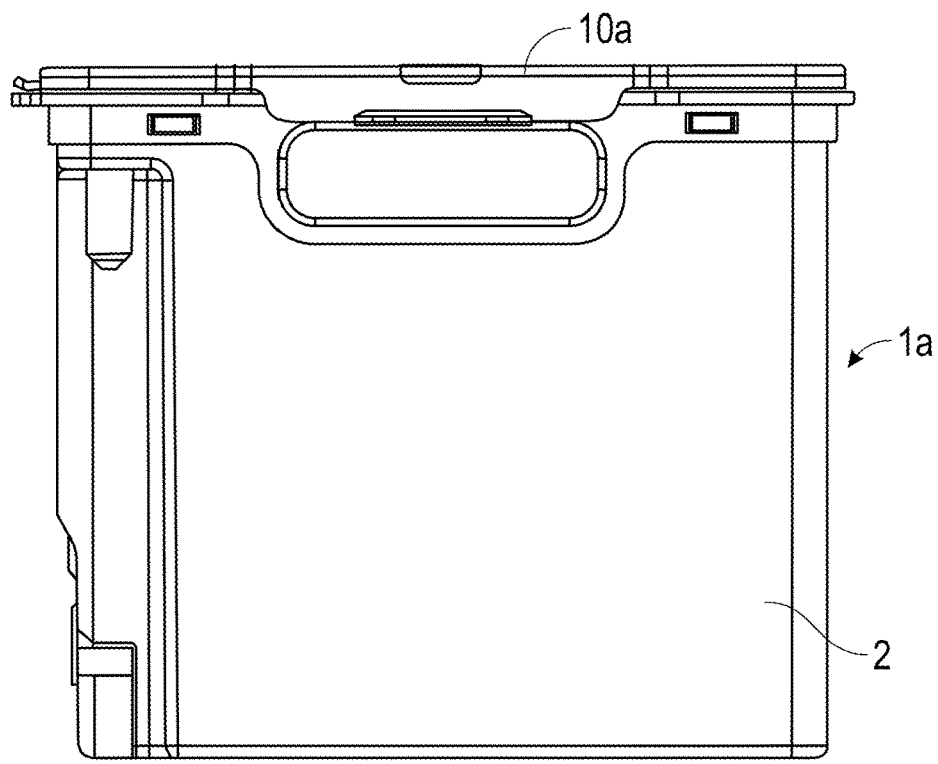
Figure 8F:
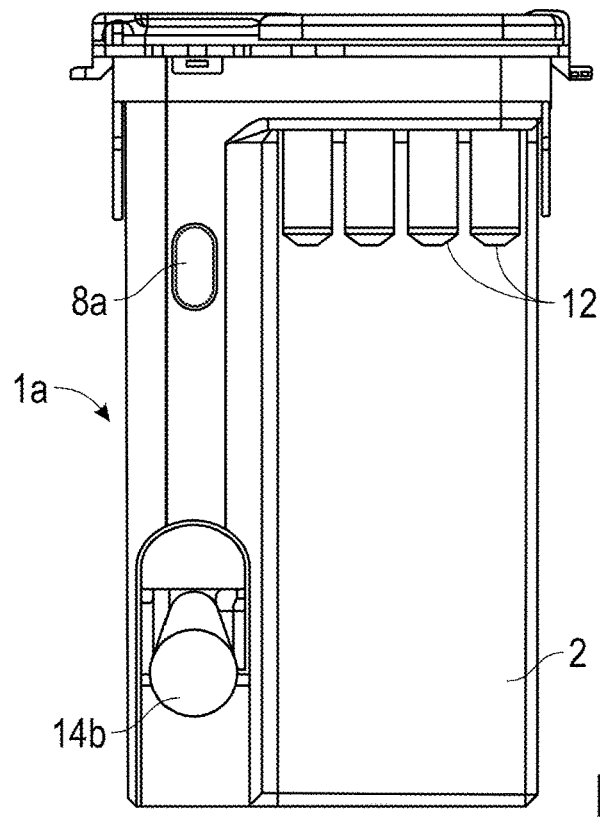
Figure 8G:
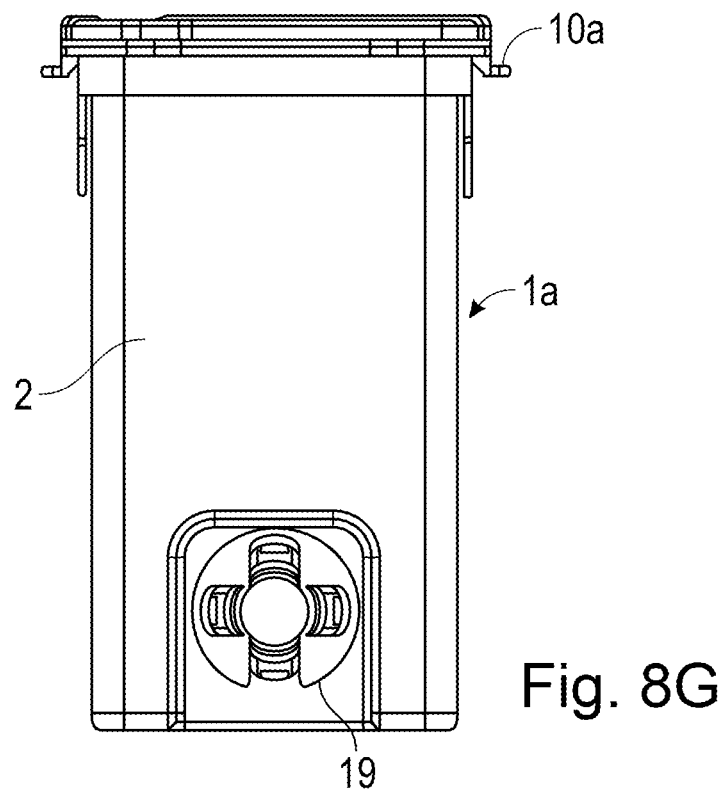
Figure 8H:
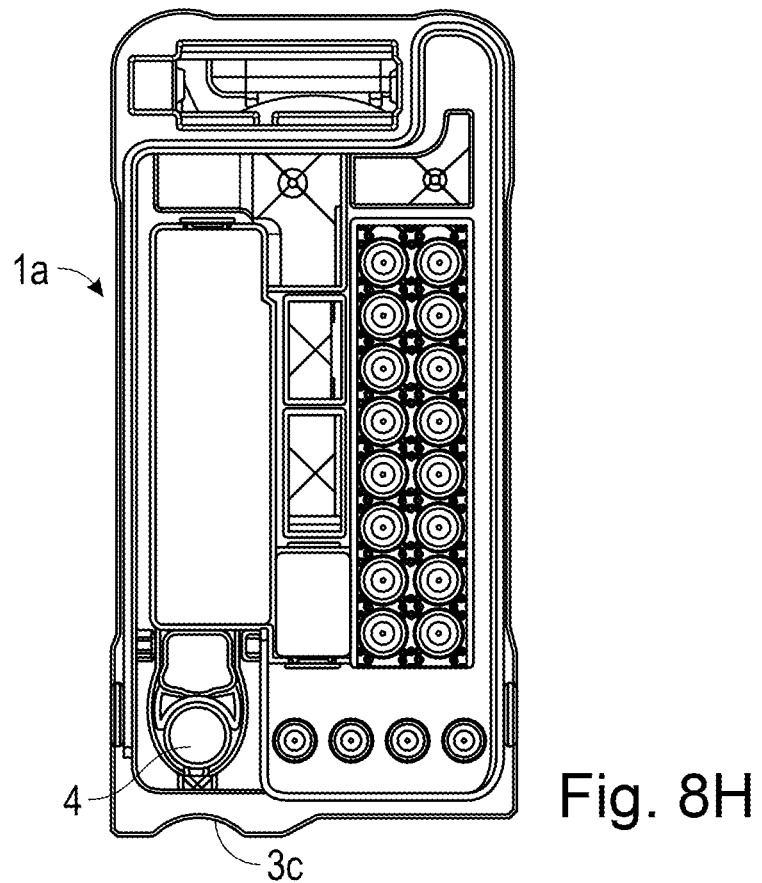

The sample preparation cartridge 1 comprises a top deck 3 (shown in particular in FIGS. 1A, 6 and 7). The top deck 3 forms the top of the sample preparation cartridge 1, and snaps over the housing 2 to be affixed thereto. The top deck comprises:

- A sample receptacle 7 for receiving the sample via a sample inlet 4, closed by a user-closable lid 6 (see FIGS. 2A, 2B and 2C). The user-closable lid 6 protects the sample inlet 4 prior to filling and also protects against accidental spills after filling. Marked on the side of the sample receptacle (for example, on an adhesive sticker) is a minimum fill line 8b (see FIG. 2A). A transparent window 8a extends above and below the minimum fill line 8b, which allows the user to determine when sufficient sample has been supplied. After sufficient sample fill, the user-closable lid 6 is closed by the user. The user-closable lid 6 is configured to close with a snap. This provides the user with tactile feedback to confirm that the lid is properly closed. Additionally, the air pressure pulse produced by closing the user-closable lid 6 can improve passing of the sample through a sample introduction filter 5 (see below). Whilst the sample inlet 4 is covered by the user-closable lid 6, the sample receptacle 7 is covered by a foil 6a (see FIG. 2C) which can be pierced by a pipetting robot once the sample preparation cartridge is received in the analysis instrument.
- A sample introduction filter 5 (see FIGS. 2A, 2B and 2C and FIG. 7), held in-line within the sample receptacle 7. The sample introduction filter 5 is held in place by the hinges of the user-closable lid 6. The sample introduction filter 5 is a 100 µm mesh stainless steel filter (made of stainless steel, for example). The sample introduction filter 5 is provided for filtering resin particles out of the sample. Such resin particles are usually provided in BCFs in order to adsorb any antimicrobials present in the blood of a patient (e.g. which may be present in the case that the patient has been taking antibiotics prior to the blood being drawn). The resins are removed to avoid that they adsorb further antimicrobials, which would affect the AST results.
- Positions for a plurality of pipette tips, for example up to 16 pipette tips 55, optionally holding pipette tips of a plurality of different sizes. In one example, the cartridge comprises six 1000 µl tips, one 300 µl tip and five 50 µl tips, with capacity is for one more 50 µl tip and two more 1000 tips. Providing a plurality of different sized tips allows different volumes of fluid to be handled. The precision of the volume handled may differ between different sized tips. The tips are pre-filled in the cartridge when it is received by the user.
- Various wells containing reagents, or for mixing reagents, or for incubating a sample and reagent(s).
- A top foil 10, covering the reagent wells, to avoid contamination of the reagents during handling. The top foil 10 can be removed by the user prior to inserting the sample preparation cartridge into the analysis instrument.

Some of the wells (in particular, some of the reagent wells) are provided as snap-in inserts, some of which may be delivered to the user in situ in the top deck 3 of the sample preparation cartridge 1, and some of which must be inserted into the top deck 3 by the user. The reagent wells may be covered by a foil that can be pierced by a pipette tip.

The housing 2 and/or top deck 3, and/or snap-in inserts comprise positions for a label (for example comprising human readable information and/or a bar code, QR code, or other machine-readable code) for identification purposes.

Some fluid handling within the sample preparation cartridge 1 is by way of the syringe 14 and multi-way valve 17 inside the sample preparation cartridge 1. Control of the syringe 14 and multi-way valve 17 to control such fluid handling steps is by the analysis instrument, and therefore the syringe 14 and multi-way valve 17 are accessible to be controlled by the analysis instrument. That is, the syringe 14 and multi-way valve 17 have interfaces with elements of the analysis instrument allowing the analysis instrument to move the syringe piston 14a, and to control the position of the multi-way valve 17.

A first interface is between the flange 14c of the syringe piston 14a and a syringe piston hook 22 provided in the analysis instrument. In order for the syringe piston flange 14c to be engaged by the syringe piston hook 22, the syringe piston flange 14c protrudes from the sample preparation cartridge 1 via a syringe piston aperture in the housing 2.

A second interface is between a valve interface slot 19 on the sample preparation cartridge 1 and a valve key 30 provided in the cartridge bay 20. The valve interface slot 19 is provided on one face 18a of a valve actuator 18 which protrudes from the housing 2 through a valve actuator aperture in the housing 2. The other face of the valve actuator 18b comprises a plurality of slots which receive arms of the multi-way valve 17. Rotation of the valve interface slot 19 turns the valve actuator 18 and hence causes rotation of the multi-way valve 17.

The valve actuator 18 has a broadly cylindrical shape, with the two faces 18a, 18b provided at either end of the cylinder.

The valve interface slot 19 comprises an open end 19a and a closed end 19b, with the broadly linear slot running between the open end and closed end. A valve interface slot 19 with this configuration is able to receive a key having a shape corresponding to the slot, but only when the valve interface slot 19 (and hence the multi-way valve 17) is in the correct orientation.

The open end 19a may flare outwardly (i.e. having an increasing towards the outermost edge of the slot 19). This allows the valve interface slot 19 and valve key 30 to slide into engagement more easily.

Figure 3:
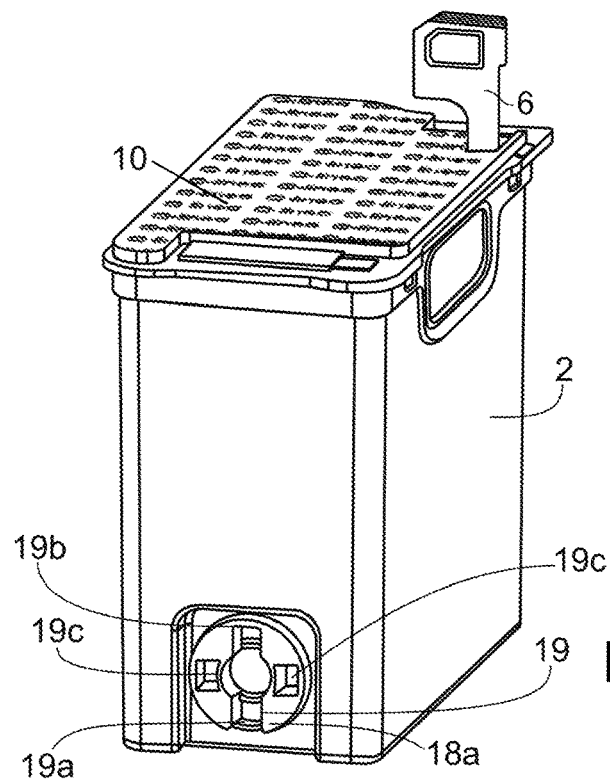
FIG. 3 shows the exemplary sample preparation cartridge of FIG. 1 from a second perspective view.
Figure 4:
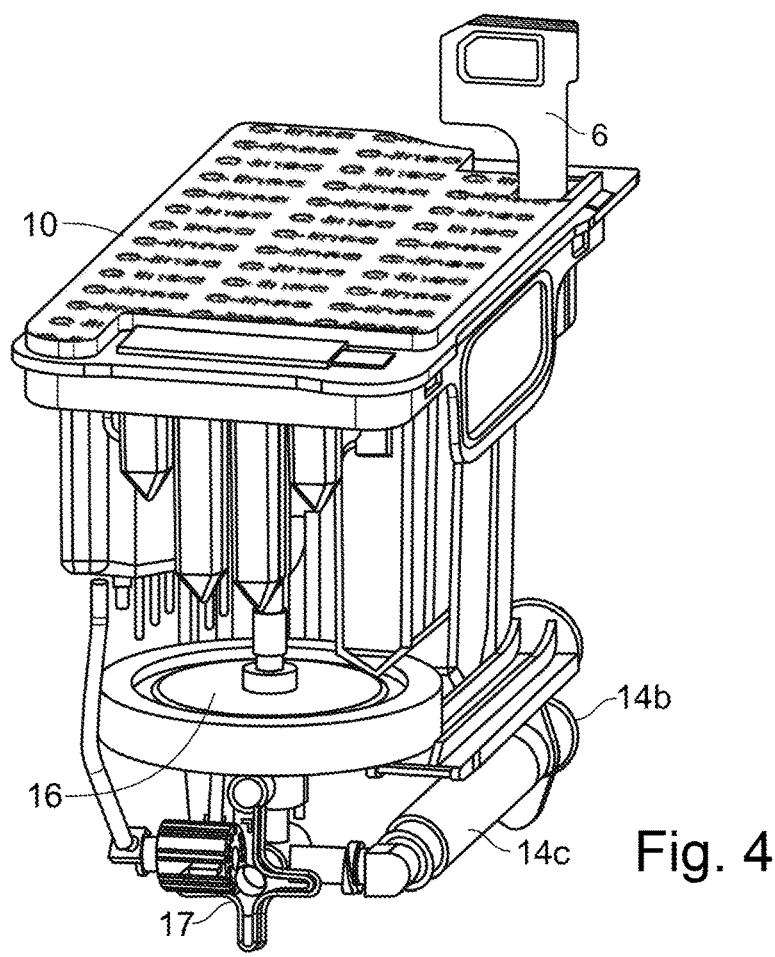
FIG. 4 shows interior features of the exemplary sample preparation cartridge of FIG. 1.

With reference to FIG. 3, the features labelled 19c are present for injection molding purposes only, and do not have any functional purpose. The valve interface slot 19 also comprises a central portion with an increased cross-section. This is again present for injection molding purposes, and does not have a functional purpose.

Figure 1D:
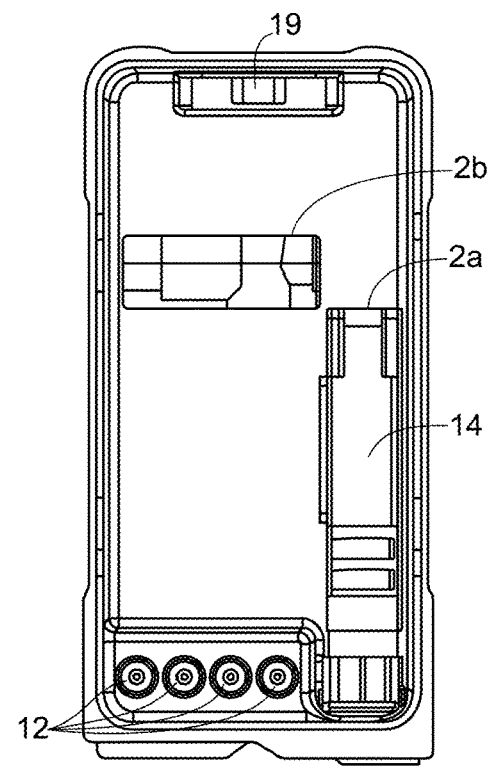
FIG. 1D shows the exemplary sample preparation cartridge from a bottom view.

With reference to FIG. 1D, aperture 2b in the housing 2 provides a means for the multi-way valve 17 to be supported from below by supporting features (not shown) in the cartridge bay 20.

A third interface provides controlled heating to the syringe barrel 14c. The housing 2 of the sample preparation cartridge 1 comprises an aperture 2a (see FIG. 1D) which allows a syringe heater 26 provided in the analysis instrument to directly contact the syringe barrel 14c.

The sample preparation cartridge 1 comprises a plurality of concentration determination wells 12, provided as part of the top deck 3. A fourth interface involves provision of heating (and cooling, if necessary) to the concentration determination wells 12 of the sample preparation cartridge 1. To allow access to the concentration determination wells 12 for heating/cooling, the concentration determination wells 12 are placed outside of the housing 2, so that they can be largely surrounded by the heating block 34 provided in the analysis instrument.

FIG. 7 shows the top deck 3 of the sample preparation cartridge 1, and illustrates the various wells which are used to contain and mix various different reagents in the process of preparing a sample for AST.

In particular, the top deck comprises a filtration inlet well 45, filtration outlet well 46, a plurality of concentration determination wells 12, a waste well 54 and a plurality of pipette tips 55. When ready to be received by the analysis instrument, the top deck 3 of the sample preparation cartridge 1 also comprises a frozen reagent insert 40 (which itself comprises a Proteinase K well 41, an ethanol well 42, a dye well 43 (containing the fluorescent stain) and a fastidious medium well 44), a CAMBH insert 47 (comprising CAMBH wells 48 and dilution wells 49) and a PBS and lysis buffer insert 51 (comprising a PBS well 52, and a lysis buffer well 53).

FIGS. 8A to 8H show another embodiment of the sample preparation cartridge 1', in which the majority of the top deck 3 (excluding the location for a snap-in insert and the user-closable lid 6 of the sample inlet 4) is covered by a lid 10', when supplied to the user. The lid 10' protects the parts covered by the lid 10' from contamination. The lid 10' has the additional functionality of preventing the sample preparation cartridge 1' from being loaded into the analysis instrument until the lid 10' is removed, and the sample preparation cartridge 1' is in a state such that it can be processed by the analysis instrument.

Finally, there are features of the sample preparation cartridge 1 and cartridge bay which allow for correct alignment and positioning of the sample preparation cartridge 1 within the cartridge bay 20.

In this example, the outer dimensions of the sample preparation cartridge 1 are approximately 63×130×113 mm (W×D×H).

The sample preparation cartridge is a single-use device. As noted above, one suitable use for the sample preparation cartridge is in preparation of a sample for AST. However, the sample preparation cartridge is not limited to such a use.

The Analysis Instrument

Some features of the analysis instrument will now be described in greater detail, by way of example only and with continuing reference to the appended drawings.

Prior to loading the sample preparation cartridge 1 into the analysis instrument, a sample from a positive blood culture flask is pipetted by the user into the sample preparation cartridge 1. The features of the analysis instrument relating to handling of the sample preparation cartridge 1 are discussed further below.

The analysis instrument can receive up to six sample preparation cartridges 1, and has six cartridge bays 20. For clarity, only one cartridge bays 20 is described in the following description; the others are substantially identical.

Figure 5:
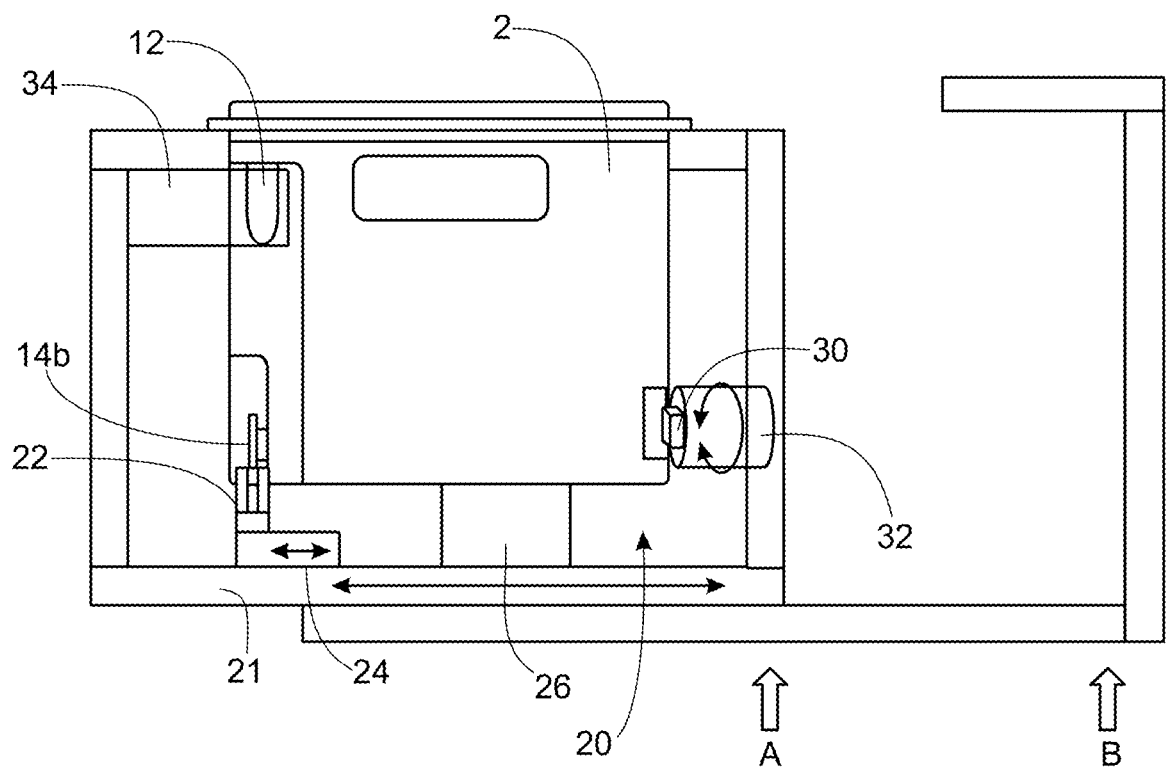
FIG. 5 shows a schematic view of the exemplary sample preparation cartridge of FIG. 1 received within a cartridge bay of an analysis instrument.

The sample preparation cartridge 1 is received into a cartridge bay 20 carried by a sled 21, shown in FIG. 5. The sled 21 is configured to slide between an input position and a processing position. In the input position, the cartridge bay 20 protrudes from the analysis instrument, and is open to the user for insertion of the sample preparation cartridge 1. The rear of the sample preparation cartridge 1 in the input position is labelled A in FIG. 5. In the processing position, the cartridge bay 20 is slid back into the analysis instrument, such that it is no longer accessible by the user. The rear of the sample preparation cartridge 1 in the processing position is labelled B in FIG. 5. Motion of the sled 21 between the input and processing positions is driven by a motor (not shown).

The sample preparation cartridge 1 is lowered down and pushed into the cartridge bay 20 such that interface points on the sample preparation cartridge 1 are received by corresponding interface points in the cartridge bay 20.

The interface positions are best shown in FIGS. 5 and 6.

A first interface is between the syringe piston 14a and the syringe piston hook 22. The syringe piston hook 22 comprises two projections, respectively forming a first abutment surface 22a of the syringe piston hook 22 and a second abutment surface 22b of the syringe piston hook 22. The two surfaces 22a, 22b are parallel vertical surfaces and are spaced apart by approximately the width of the syringe piston flange 14b. The second abutment surface 22b comprises two tines 22c with a groove 22d therebetween. The groove 22d is sized so as to receive the syringe piston 14a.

On insertion of the sample preparation cartridge 1 into the cartridge bay 20, the syringe piston flange 14b drops between the first and second abutment surfaces 22a, 22b of the syringe piston hook 22. The syringe piston flange 14b (and hence the syringe piston 14a) is held between the first abutment surface 22a and the tines 22c of the second abutment surface 22b. The syringe piston hook 22 is slidable along a rail 24 to move the syringe piston 14a in and out of the syringe barrel 14c.

A second interface provides controlled heating to the syringe barrel 14c. Provided in the cartridge bay 20 (on sled 21) is a syringe heater 26. The syringe heater 26 comprises a heater (in this case, MCH1-38W-003 from COMSTAT), and an aluminum block which has a heating surface shaped to conform to the outer surface of the syringe barrel 14c. The housing 2 of the sample preparation cartridge 1 comprises an aperture which allows the syringe heater 26 to directly contact the syringe barrel 14c.

The syringe heater 26 is spring-mounted on springs (not shown), such that when the sample preparation cartridge 1 is fitted into the cartridge bay 20, the syringe barrel 14c presses down onto the syringe heater 26 against the biasing force of the springs, to ensure good contact between the heating surface of the syringe heater 26 and the syringe barrel 14*c*.

The heating provided by the syringe heater 26 is controlled by a controller which receives data from first and second temperature sensors, and adjusts the output of the syringe heater 26 accordingly.

The first temperature sensor (not shown) is a negative temperature coefficient (NTC) thermistor which measures the temperature of the syringe heater 26 itself. The first temperature sensor is integrated into the syringe heater 26. One such suitable temperature sensor is NTCLP100E3103H from Vishay BC Components.

The second temperature sensor 28 is an IR sensor (in this case, MLX-90614 from Melexis) configured to measure the temperature of the syringe contents.

The first and second temperature sensors measure temperature several times per second, in this case.

Use of the two independent temperature sensors enables the sample to be heated to a desired predetermined temperature as quickly as possible, without risking the integrity of the sample. For example, when the sample is a blood sample for AST, there is a risk that that the sample could be clotted by overheating, or that pathogens in the sample could be killed by overheating. This should be avoided.

In the described configuration, heating of the syringe is carried out only from one side (i.e. predominantly where the syringe barrel 14*c* is in contact with the syringe heater 26). To heat as quickly as possible, the syringe heater 26 is initially heated to a higher temperature (for example, 50° C., as measured by the first temperature sensor) than the temperature to which it is desired to heat the contents of the syringe (for example, the sample in the syringe may be at a temperature of 35° C. when the syringe heater 26 is at a temperature of 37° C.). The syringe heater 26 is not heated above 50° C. These temperatures are of course exemplary only.

Figure 9:
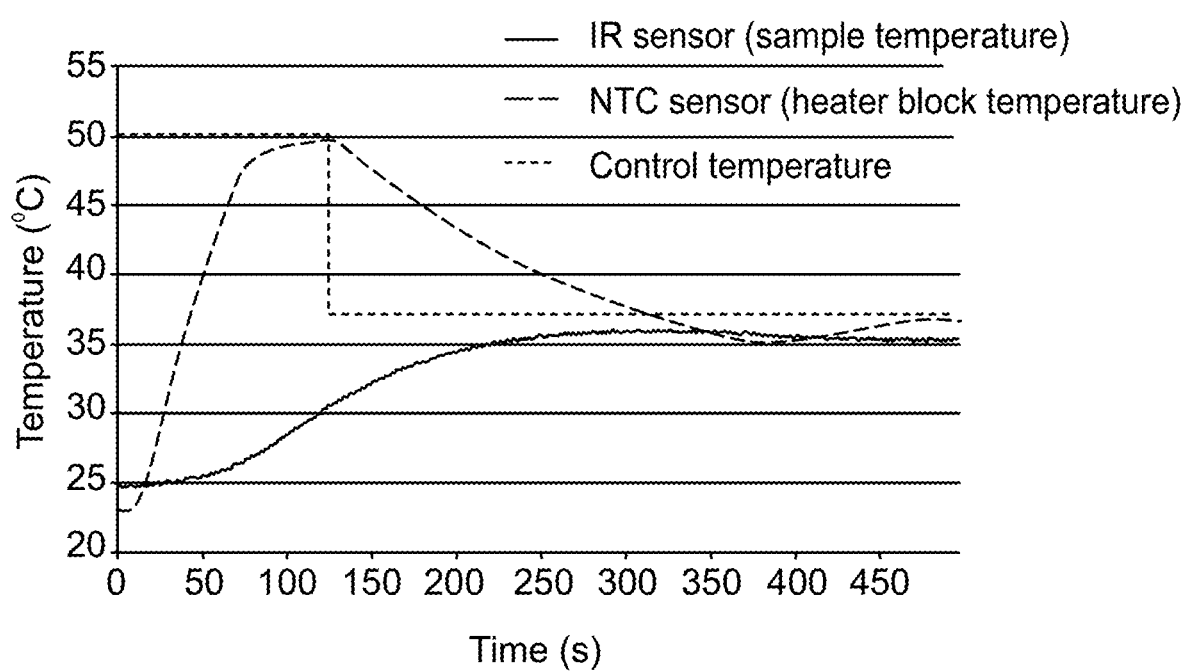
FIG. 9 shows exemplary control temperatures and measured temperatures relating to the first controllable heater.

FIG. 9 shows the control temperature (at 50° C. and 37° C.), and the resultant temperatures measured by the NTC sensor (measuring the syringe heater temperature 26) and the IR sensor (measuring the temperature of the sample in the syringe 14).

As the sample in the syringe barrel 14*c* is heated by the syringe heater 26, the second temperature sensor 28 simultaneously measures the temperature of the sample in the syringe barrel 14*c*.

The temperature of the sample in the syringe 14 may not be at a predetermined temperature when the sample is first received within the syringe 14. For example, the sample may have been pre-heated (in a blood culture cabinet, for example) or may have been left under room temperature conditions for some time before being input into the sample preparation cartridge 1. Moreover, the cartridge bay 20 is not in a temperature-controlled area of the analysis instrument, such that the temperature in the cartridge bay 20 may vary. Provision of the second temperature sensor 28 therefore allows the sample to be heated more accurately, by taking into account the actual ambient conditions and the initial temperature of the sample.

Additionally, contact between the syringe heater 26 and the syringe barrel 14*c* may not be equally good every time a sample preparation cartridge 1 is placed in the cartridge bay 20 (i.e. contact between the syringe heater 26 and the syringe barrel 14*c* may not be consistent for every sample preparation cartridge 1). Again, provision of the second temperature sensor 28 allows the sample to be heated more accurately, even under these circumstances.

When the temperature measured by the second temperature sensor 28 reaches a predetermined value (for example, 30° C.), the temperature of the syringe heater 26 (as measured by the first temperature sensor) is reduced to the predetermined desired temperature of 37° C. This allows the sample in the syringe 14 to reach a temperature of 35° C. That is, the control temperature (i.e. the temperature that the syringe heater 26 eventually reaches) is set 2° C. above the desired sample temperature in the syringe 14, as this compensates for temperature loss in the system (for example due to the fact that the syringe heater 26 does not entirely surround the syringe 14).

A third interface is between the valve interface slot 19 on the sample preparation cartridge 1 and the valve key 30 provided in the cartridge bay 20.

The valve key 30 is connected to a valve motor 32 configured to turn the valve key 30. The valve interface slot 19 is provided on one face 18*a* of a valve actuator 18, which is itself connected to the multi-way valve 17. Turning the valve key 30 (using the valve motor 32) turns the valve actuator 18 (via the interface of the valve key with the valve interface slot 19), which turns the multi-way valve 17.

As explained above, the valve interface slot 19 comprises an open end 19*a* and a closed end 19*b*, with a linear slot running between. The valve interface slot 19 is received over the valve key 30, which has a shape corresponding to that of the linear slot 19.

The valve interface slot 19 can only be received over the valve key 30 when the valve interface slot is in a predetermined orientation, i.e. with the open end 19*a* of the valve interface slot 19 oriented vertically downwardly, to be received over the valve key 30 which is also orientated vertically (i.e. the longitudinal extent of the valve key is orientated vertically). When the valve interface slot 19 is not orientated vertically, or when it is orientated vertically but with the closed end 19*b* oriented vertically downwardly, the valve interface slot 19 cannot be received over the valve key 30. This means that, when the sample preparation cartridge 1 is received in the cartridge bay 20, the multi-way valve 17 is in a known, predetermined position (it must be in that position in order for the valve interface slot 19 to be received over the valve key 30).

The valve actuator 18 and syringe piston flange 14*b* may protrude from opposite sides of the sample preparation cartridge 1. Accordingly, the valve key 30 and the syringe piston hook 22 which respectively engage with these portions may be provided at opposite sides of the cartridge bay 20.

A fourth interface involves provision of heating to the concentration determination wells 12 of the sample preparation cartridge 1. Heating is by way of a heating block 34 shaped to receive the four concentration determination wells 12 of the sample preparation cartridge 1. The heating block 34 comprises an aluminum block milled to provide holes corresponding to the shapes of the concentration determination wells 12, coupled to a heater. The heating block 34 comprises an integrated temperature sensor (not shown). One such suitable temperature sensor is NTCLP100E3103H from Vishay BC Components.

The cartridge bay 20 comprises a shell housing the various components outlined above. The shell may be perforated at the sides (i.e. the sides have holes in them) close to the heating block 34. This allows heat to be moved out of the shell.

The cartridge bay 20 also comprises a cooling means (a Peltier element comprising a cooling fan, both integrated into the heating block 34) which is operated in the event that the temperature rises too high within the cartridge bay 20, causing the heating block 34 to become too hot (as measured by the integrated temperature sensor in the heating block 34). Under these circumstances, the Peltier element and fan are operated to cool the heating block 34.

The fan may be mounted at an angle to the heating block 34 so that the airflow both cools the heating block 34, but also serves to move air in and out of the cartridge bay 20 through holes (perforations) in the sides of the cartridge bay shell.

Finally, there are features of the sample preparation cartridge 1 which allow for correct alignment and positioning of the sample preparation cartridge 1 within the cartridge bay 20 In particular, these relate to the shape of the upper outer rim 3*b* of the top deck 3 (see FIGS. 2, 6 and 7), and to projecting stop 3*a* projecting upwards therefrom (see FIG. 7).

As will be seen from FIG. 7, the upper outer rim 3*b* of the sample preparation cartridge 1 is wider at the syringe-end of the cartridge (the lower edge, as shown in FIG. 7)—this is the side that faces outwards from the system, i.e. closest to the user on insertion of the sample preparation cartridge 1 into the cartridge bay 20.

As the sample preparation cartridge 1 is pulled into the analysis instrument, the upper outer rim 3*b* is guided into two opposed C-shaped guides in the cartridge bay 20. At the end closest to the front of the analysis instrument, the C-shaped guides have a maximum height, and the distance between the two opposed C-shaped guides is a maximum. Moving into the interior of the analysis instrument, the height of the C-shaped guides reduces, and the distance between the two opposed C-shaped guides also reduces. The guides grip the sample preparation cartridge 1 with increasing tightness as its increasing width (at the upper outer rim 3*b*) is pulled through the C-shaped guides.

The projecting stop 3*a* abuts a corresponding narrowing in the height of the C-shaped guides when the valve-end of the sample preparation cartridge 1 (this is the side that faces inwards towards the system, i.e. furthest from the user on insertion of the sample preparation cartridge 1 into the cartridge bay 20) reaches the end of the C-shaped guides. Movement of the sample preparation cartridge 1 is then stopped.

The sample preparation cartridge 1 is positioned within the cartridge bay 20 with a tolerance of 50-100 µm, in each of the X, Y and Z directions.

Figure 10A:
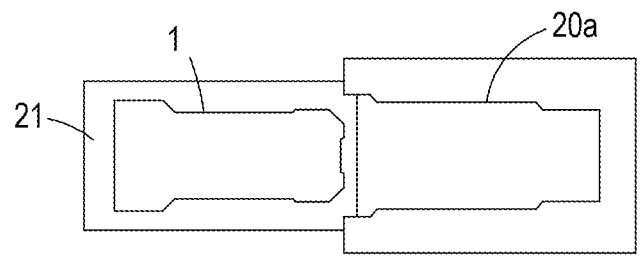
FIG. 10 shows alignment of the sample preparation cartridge in the x-y plane as the cartridge bay moves into the analysis instrument.
Figure 10B:
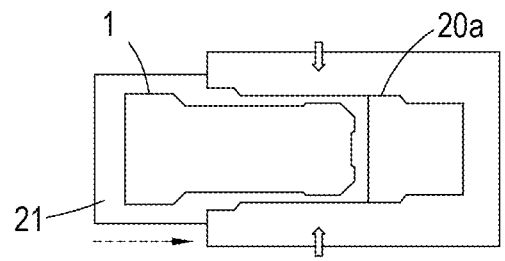
Figure 10C:
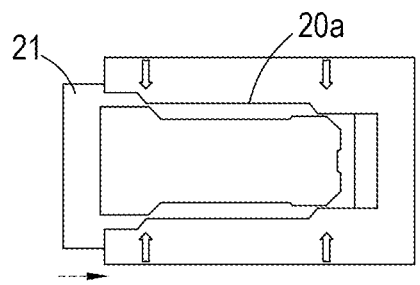
Figure 10D:
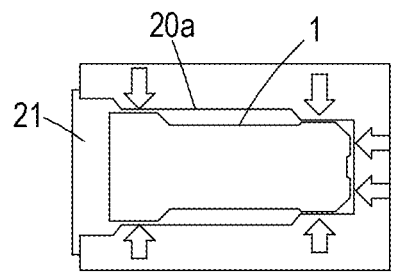

A similar process is carried out for alignment of the sample preparation cartridge in the X-Y plane, as shown in FIGS. 10A to 10D. FIG. 10A shows the cartridge bay open, with the sample preparation cartridge in the load position on the sled 21. FIG. 10B shows the cartridge bay closing, with the sled 21 moving into the instrument, and the front of the sample preparation cartridge entering the guide 20*a*, providing coarse alignment. In FIG. 10C, the cartridge bay is almost closed, and the front and rear of the sample preparation cartridge 1 are within fine alignment zones of the guide. FIG. 10D shows the bay fully closed, with the sample preparation cartridge fully positioned.

The upper outer rim 3*b* of the top deck 3 may also have a cut-out 3*c* (see FIG. 8H) which lies beneath the outer edge of the user-closable lid 6 to enable the user to easily lift the user-closable lid 6 to open it.

The presence of the sample preparation cartridge 1 is checked by the analysis instrument after closure of the cartridge bay 20 (i.e. after sled 21 has been slid into the analysis instrument to the processing position). This is carried out by an optical sensor (not shown) used to check that there is a sample preparation cartridge 1 loaded into the cartridge bay 20 before processing of the sample preparation cartridge 1 begins. One such suitable sensor is reflective sensor, for example OPB740WZ from TT Electronics.

Sample Preparation Process

An exemplary process which could be carried out by the sample preparation cartridge 1 disclosed herein is set out below. The process steps generally involve transferring fluid from one place to another. In most cases, the transfer of fluid is carried out by a pipetting robot (not shown) in the analysis instrument. Some fluid transfer however is accomplished via the syringe 14 and multi-way valve 17 in the sample preparation cartridge 1. In the exemplary process, the following steps are carried out:

1. Add the sample to the sample inlet. The sample is filtered (to remove resin) through the sample introduction filter 5 under gravity, and is received in the sample receptacle 7.
2. Pipette the filtered sample from the sample receptacle 7 into the filtration inlet well 45.
3. Pipette lysis buffer from the lysis buffer well 53 to the proteinase K well 41;
4. Pipette the mix of lysis buffer and proteinase K to the filtration inlet well 45 (containing the sample). The filtration inlet well 45 then contains the lysis mixture.
5. Draw the lysis mixture into the syringe 14, heat and incubate.
6. Push the lysed mixture through the filter 16 and into the filtration outlet well 46.
7. Pipette CAMBH from the CAMBH well 48 to the filtration inlet well 45.
8. Push the CAMBH from the filtration inlet well 45 through the filter 16 to wash the filter.
9. Empty the filtration outlet well 46 by pipetting.
10. Pipette an additional aliquot of CAMBH to the filtration inlet well 45.
11. Push the CAMBH from the filtration inlet well 45 through the filter 16 into the filtration outlet well 46, then pull it back through the filter 16 (backflush) and into the filtration inlet well 45 in order to resuspend pathogens captured on the filter 16.
12. Pipette an aliquot of the resuspendate from the filtration inlet well 45 to a first concentration determination well;
13. Pipette ethanol from the ethanol well 42 to the first concentration determination well (containing resuspendate);
14. Incubate
15. Pipette PBS from the PBS well 52 to a second concentration determination well;
16. Pipette PBS from the PBS well 52 to the first concentration determination well (containing resuspendate and ethanol);
17. Pipette some of the contents of the first concentration determination well (containing resuspendate, ethanol and PBS) into the second concentration determination well (containing PBS);
18. Pipette dye to third and fourth concentration determination wells;
19. Pipette contents of the second concentration determination well (containing resuspendate, ethanol and PBS) into the fourth concentration determination well (containing dye);
20. Pipette contents of the first concentration determination well (containing the resuspendate, ethanol and PBS) into the third concentration determination well (containing dye);

21. Incubate
22. Pipette the contents of the fourth concentration determination well into a first concentration determination well in the sample holder;
23. Pipette the contents of the third concentration determination well into a second concentration determination well in the sample holder.

After the concentrations of the pathogens in the first and/or second concentration determination wells of the sample holder have been determined, the following pipetting operations are carried out (in a given scheme where the concentration is determined to be in a given range):

24. Pipette growth medium to a first dilution well;
25. Pipette growth medium to a second dilution well;
26. Pipette resuspendate from the input well to the first dilution well (containing growth medium);
27. Pipette contents of second dilution well (containing resuspendate in growth medium) into the third dilution well (prefilled with growth medium).
28. Pipette contents of second dilution well (containing resuspendate in growth medium) into the fourth dilution well (prefilled with growth medium).
29. Pipette first and second fastidious medium from a fastidious media well to the fourth dilution well (containing growth medium);
30. Pipette the contents of the third dilution well (containing resuspendate in growth medium) to the sample input port(s) of the sample holder, to fill the sample wells in a sample holder for AST;
31. Pipette the contents of the fourth dilution well (containing resuspendate in growth medium and first and second fastidious media) to the sample input port(s) of the sample holder, to fill the sample wells in a sample holder for AST.

The foregoing is only an example of one process that could be carried within the sample preparation cartridge 1; many variations are possible. For example, the procedure could be changed in the event that some of the reagents are provided in a different state (for example, dried or lyophilized). Additionally, the dilutions steps may be handled differently depending on the initial concentration of the sample.

The invention claimed is:

1. An analysis instrument comprising:
a cartridge bay for receiving a sample preparation cartridge; and
a controller,
wherein the cartridge bay comprises:
a controllable heater for heating a sample;
a first temperature sensor for monitoring a temperature of the controllable heater; and
a second temperature sensor for monitoring a temperature of the sample,
wherein the controller is configured to:
receive data from the first temperature sensor and the second temperature sensor;
control the temperature of the controllable heater, based on the data received from the first temperature sensor and the second temperature sensor; and
heat the sample to a predetermined temperature by controlling the controllable heater so as to:
be at an initial temperature that is higher than the predetermined temperature, whilst the temperature of the sample monitored by the second temperature sensor is below a predetermined threshold; and
reduce the temperature of the controllable heater from the initial temperature to a lower temperature which is higher than the predetermined temperature by a predetermined offset, when the temperature of the sample monitored by the second temperature sensor exceeds the predetermined threshold.

2. The analysis instrument according to claim 1, wherein the first temperature sensor is a negative temperature coefficient thermistor, and/or the second temperature sensor is an infrared sensor.

3. The analysis instrument according to claim 1, wherein the controllable heater comprises a cylindrical concave heating surface.

4. The analysis instrument according to claim 1, wherein the controllable heater is spring mounted.

5. The analysis instrument according to claim 1, wherein the controllable heater is a first controllable heater and the cartridge bay further comprises a second controllable heater shaped to receive a plurality of wells defined in the sample preparation cartridge, for heating contents of the plurality of wells.

6. The analysis instrument according to claim 5, wherein the second controllable heater comprises a third temperature sensor.

7. The analysis instrument according to claim 1, wherein the cartridge bay further comprises a key for engagement with a corresponding slot on the sample preparation cartridge.

8. The analysis instrument according to claim 7, wherein the cartridge bay further comprises a motor configured to rotate the key.

9. The analysis instrument according to claim 1, wherein the cartridge bay further comprises a hook configured to receive a syringe piston flange.

10. The analysis instrument according to claim 9, further comprising a motor for moving the hook along a linear rail.

11. A system comprising:
the analysis instrument according to claim 1; and
the sample preparation cartridge,
wherein:
the sample preparation cartridge comprises:
a multi-way valve; and
a syringe,
the syringe comprises:
a barrel for receiving a fluid;
a piston slidably located within the barrel; and
an orifice for flow of the fluid into and out of the barrel, under action of the piston, and
wherein:
the barrel is fluidly connected to the multi-way valve via the orifice; and
the sample preparation cartridge is in the cartridge bay of the analysis instrument.

12. The analysis instrument according to claim 5, wherein the second controllable heater is a heater block comprising blind holes into which the plurality of wells defined in the sample preparation cartridge can be received.

13. The analysis instrument according to claim 6, wherein the controller is configured to control a temperature of the second controllable heater to be at the predetermined temperature.

14. The analysis instrument according to claim 1, wherein the controllable heater is configured to receive and heat a syringe barrel of the sample preparation cartridge, and the syringe barrel is configured to hold the sample.

15. A system comprising:
an analysis instrument; and
a sample preparation cartridge,
wherein:
the analysis instrument comprises:
   a cartridge bay for receiving the sample preparation cartridge; and
   a controller,
the cartridge bay comprises:
   a controllable heater for heating a sample;
   a first temperature sensor for monitoring a temperature of the controllable heater; and
   a second temperature sensor for monitoring a temperature of the sample, the controller is configured to:
   receive data from the first temperature sensor and the second temperature sensor;
   control the temperature of the controllable heater, based on the data received from the first temperature sensor and the second temperature sensor; and
   heat the sample to a predetermined temperature by controlling the controllable heater so as to:
      be at an initial temperature that is higher than the predetermined temperature, whilst the temperature of the sample monitored by the second temperature sensor is below a predetermined threshold; and
      reduce the temperature of the controllable heater from the initial temperature to a lower temperature, when the temperature of the sample monitored by the second temperature sensor exceeds the predetermined threshold,
the sample preparation cartridge comprises:
   a multi-way valve; and
   a syringe,
the syringe comprises:
   a barrel for receiving a fluid;
   a piston slidably located within the barrel; and
   an orifice for flow of the fluid into and out of the barrel, under action of the piston, and
   wherein:
   the barrel is fluidly connected to the multi-way valve via the orifice; and
   the sample preparation cartridge is in the cartridge bay of the analysis instrument.

16. The system according to claim 15, wherein the sample preparation cartridge is configured to be lowered into the cartridge bay of the analysis instrument.

17. The system according to claim 15, wherein the sample preparation cartridge is configured for preparing the sample for analysis from a positive blood culture flask, and the analysis instrument is configured to perform antimicrobial susceptibility testing on the sample.

* * * * *